(No Model.)
J. NAYLOR.
Manufacture of Articles from Plastic Materials.
No. 235,799. Patented Dec. 21, 1880.
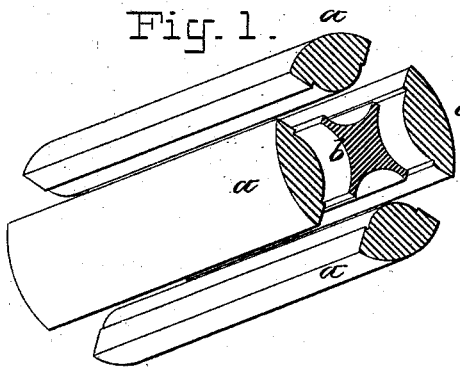
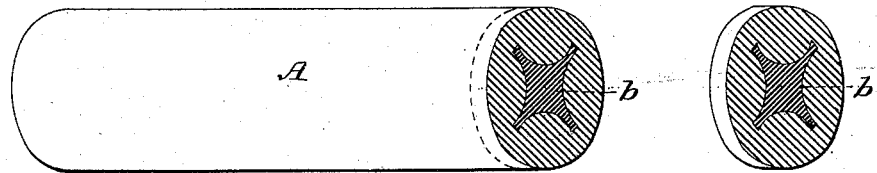 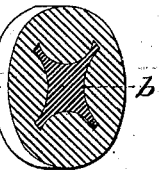
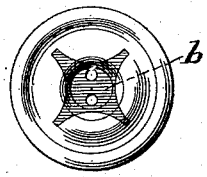 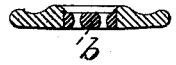 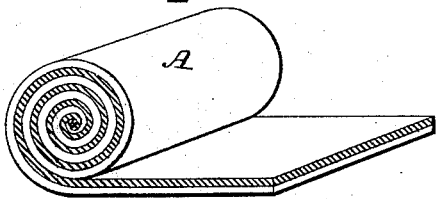
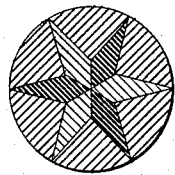 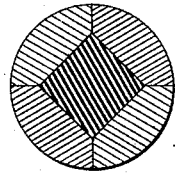 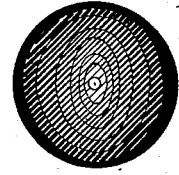 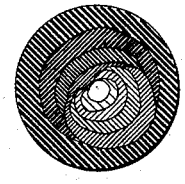
ATTEST:
E. B. Bolton
Geo. Bainton
INVENTOR:
Joseph Naylor
by his Attys—
Burke, Fraser & Connett.

UNITED STATES PATENT OFFICE.

JOSEPH NAYLOR, OF STERLING, NEW JERSEY.

MANUFACTURE OF ARTICLES FROM PLASTIC MATERIAL.

SPECIFICATION forming part of Letters Patent No. 235,799, dated December 21, 1880.

Application filed October 15, 1880. (No model.)

*To all whom it may concern:*

Be it known that I, JOSEPH NAYLOR, of Sterling, Morris county, New Jersey, have invented certain Improvements in the Manufacture of Articles from Plastic Materials, of which the following is a specification.

This invention relates to the manufacture of articles from plastic materials, such as factitious ivory, it being especially adapted to the manufacture of buttons, checks, and other small articles.

The invention consists, essentially, in the formation of a cylinder, stick, roll, or rod from the plastic material, from the end of which blanks or disks are cut to form the buttons or articles, or the faces thereof, by building it up from rods or sticks, or sheets of the materials, generally having different colors, so that the end of the cylinder or compound stick so formed will present a pattern or design which extends through the same from end to end, all as will be more particularly hereinafter set forth.

In the drawings which serve to illustrate my invention, Figure 1 is a perspective view, showing various elements or lesser sticks arranged in their proper relative positions to form a cylinder, but slightly separated to better show their elemental character. Fig. 2 is a perspective view of the compound stick after consolidation. Fig. 3 is a view of a blank cut from the end of the cylinder; and Figs. 4 and 5 are, respectively, a plan and section of a button molded from the blank shown in Fig. 3. Fig. 6 shows a method of forming the cylinder or roll from sheets of the plastic material of different colors. Figs. 7, 8, 9, and 10 show different designs, formed by bundling together the lesser sticks or sheets of different colors or tints.

Referring to the first three figures, let *a a a a* represent sticks or rods of the plastic material having like sections and, for example, like colors, as red; and let *b* represent a fluted core of the same material, but having a contrasted color, as yellow. These are, or may be, molded of the proper shape, and of such proportions that when brought together they will form a cylinder. This cylinder may be of any size desired, but preferably of the same diameter as the button or other article to be made from it. After being brought together the elements *a* and *b* are caused to adhere by heat or other means. This finished cylinder I designate by the letter A. When thus completed the end of the cylinder A, or any section thereof, will present a red ground with a yellow center, as seen in the disk-like blank shown in Fig. 3, the lines at the junction of the pieces *a a* being obliterated by the consolidation.

The blanks or disks are cut from the end of the cylinder A, as indicated by the dotted line in Fig. 2, and these blanks are then placed in a mold or die and pressed into their required form. In some cases I take sheets of the plastic material of different colors, and after placing one on the other, roll them into the form of a cylinder, as represented in Fig. 6. Sections cut through a cylinder thus formed present the appearance of volutes or spirals of different colors arranged in alternate order. I may use two or more sheets of different colors, or I may use but one sheet and sprinkle over its face gold-powder or other similar material, and then roll said sheet into a cylindrical form, when a section of it will show a fine spiral line of gold. This design may be diversified by omitting the gold at some points.

In Figs. 9 and 10 I have shown designs intended to imitate shell and horn, respectively. In these the lines around the core (representing the growths or laminæ) are neither concentric nor spiral, and cannot well be produced by rolling up sheets. I usually make cylinders of this character by first making a slender core of white material, and surrounding this with laminæ having sections of a crescent shape, the whole being afterward consolidated. Where horn or shell is being imitated the laminæ will be tinted, those nearest the core being lightest, and growing darker as the periphery is approached.

I do not always form the entire button or article from the cylinder or stick having a design running through it. I may cut only a thin slice from the end of the stick and employ it to veneer the face of a disk of plain material. In this way I can produce the articles cheaper than when made entirely from the prepared cylinder. In some cases I may veneer both faces of the article. The sticks may be prisms instead of cylinders, the form depending on the articles to be made from them.

It will be understood that white, black, or any colors may be employed, the variety depending somewhat upon the normal color of the plastic material employed.

The methods employed in compounding and coloring such plastic materials are too well known to require description here.

Having thus described my invention, I claim—

1. The herein-described method of making or preparing rolls, sticks, or cylinders of plastic material from the ends of which are to be cut blanks to form buttons or other articles or veneers for the same, which consists in placing together, side by side, sticks, sheets, or elements of the plastic material of different colors and then consolidating the same, whereby a finished cylinder or stick is formed, transverse sections of which, taken at any point, present the same design in the same colors, substantially as set forth.

2. The improvement in the manufacture of articles from plastic materials which consists in first producing or forming a stick or cylinder of the plastic material having a design in different colors or tints running through it from end to end; second, consolidating said stick or cylinder; third, cutting from the end of said completed stick or cylinder disks or blanks of the proper thickness; and, fourth, pressing said blanks in molds or dies, whereby they are given the required shape, substantially as set forth.

In witness whereof I have hereunto signed my name in the presence of two subscribing witnesses.

JOS. NAYLOR.

Witnesses:
 HENRY CONNETT,
 ARTHUR C. FRASER.